US009372856B2

(12) United States Patent
MacDonald

(10) Patent No.: US 9,372,856 B2
(45) Date of Patent: Jun. 21, 2016

(54) GENERATING CUSTOM TEXT DOCUMENTS FROM MULTIDIMENSIONAL SOURCES OF TEXT

(75) Inventor: Darren T. MacDonald, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 793 days.

(21) Appl. No.: 13/418,062

(22) Filed: Mar. 12, 2012

(65) Prior Publication Data

US 2013/0239036 A1    Sep. 12, 2013

(51) Int. Cl.
*G06F 3/048*    (2013.01)
*G06F 17/30*    (2006.01)

(52) U.S. Cl.
CPC .... *G06F 17/30011* (2013.01); *G06F 17/30592* (2013.01)

(58) Field of Classification Search
CPC ................................. G06F 3/048; G06F 17/30
USPC ........................... 715/769; 707/722, E17.014
See application file for complete search history.

(56) References Cited

U.S. PATENT DOCUMENTS

| 6,581,068 | B1 | 6/2003 | Bensoussan et al. |
| 7,243,106 | B2 | 7/2007 | Vierich et al. |
| 7,269,786 | B1 | 9/2007 | Malloy et al. |
| 7,730,059 | B2 | 6/2010 | Behnen et al. |
| 7,734,661 | B2 | 6/2010 | Jordan et al. |
| 7,792,784 | B2 | 9/2010 | Gupta |
| 7,949,654 | B2 | 5/2011 | Das et al. |
| 2005/0262039 | A1 | 11/2005 | Kreulen et al. |
| 2007/0192300 | A1* | 8/2007 | Reuther et al. ..................... 707/3 |
| 2007/0239508 | A1* | 10/2007 | Fazal et al. ......................... 705/8 |
| 2008/0040309 | A1* | 2/2008 | Aldridge ............................ 707/1 |
| 2008/0294596 | A1* | 11/2008 | Xiong ............................... 707/2 |
| 2009/0327852 | A1* | 12/2009 | MacGregor et al. .......... 715/214 |
| 2010/0169267 | A1 | 7/2010 | John et al. |
| 2011/0035353 | A1 | 2/2011 | Bailey |

OTHER PUBLICATIONS

Albers, Michael J. "Multidimensional Analysis for Custom Content for Multiple Audiences" SIGDOC '03, Oct. 12-15, 2003, San Francisco, CA, 2003 ACM, 5 pgs.
Day et al. "Introduction to the Darwin Information Typing Architecture", developerWorks, Sep. 28, 2005, Published Mar. 1, 2001, International Business Machines Corp., 2002, available at www.ibm.com/developerworks/xml/library/x-dita1/, accessed Apr. 10, 2012, 8 pgs.
"DITA Publishing Concepts", IBM FileNet p8 documentation, available at http://publib.boulder.ibm.com/infocenter/p8docs/v4r5m1/index.jsp?topic=%2Fcom.ibm.p8.doc%2Fdeveloper_help%2Fcontent_engine_api%2Fguide%2Fdita_concepts.htm, accessed Apr. 10, 2012, 8 pgs.

(Continued)

*Primary Examiner* — Tadeese Hailu
*Assistant Examiner* — Darrin Hope
(74) *Attorney, Agent, or Firm* — Shumaker & Sieffert, P.A.

(57) ABSTRACT

An example method includes receiving a multidimensional query term on one or more selected sources of text in a data source, and executing a query on the one or more selected sources of text in the data source based on the multidimensional query term. The method further includes retrieving a query result set comprising elements of text responsive to the multidimensional query term from the one or more selected sources of text in the data source, generating a custom text document based at least in part on the query result set, and providing the custom text document via an output device.

24 Claims, 7 Drawing Sheets

(56) References Cited

OTHER PUBLICATIONS

Berchtold et al. "Optimal Multidimensional Query Processing Using Tree Striping", DaWaK 2000, LNCS 1874, p. 244-257, Springer-Verlag Berlin Heidelberg, 2000.

Inmon "Data Warehousing in a Healthcare Environment", The Data Administration Newsletter, available at www.tdan.com/print/4585 accessed Nov. 8, 2011, published Jan. 1, 2007, 7 pgs.

Nicola et al. "From Text Analytics to Data Warehousing: Process Output from OmniFind Analytics Edition with DB2 and pureXML", IBM Corporation, Apr. 24, 2008, 24 pgs.

Grimes "From Text Analytics to Data Warehousing", available at http://www.informationweek.com/blog/228901095, accessed Nov. 8, 2011,InformationWeek, May 18, 2008, 2 pgs.

"Linux Cover Story-Multidimensional Tagging" available at linux.sys-con/node/219964/print, accessed Nov. 8, 2011, Sys-Con Media Inc., 2008, 3 pgs.

Ravat et al. "OLAP Aggregation Function for Textual Data Warehouse", available at ftp://ftp.irit.fr/IRIT/SIG/ICEIS_Agg.pdf, accessed Mar. 12, 2012, ICEIS, Mar. 9, 2007, 6 pgs.

Inmon "Including Unstructured Text in the Data Warehouse", available at www.b-eye-network.com/print/12870, accessed Nov. 8, 2011, BeyeNetwork,originally published Apr. 1, 2010, 5 pgs.

\* cited by examiner

GENERATING CUSTOM TEXT DOCUMENTS FROM MULTIDIMENSIONAL SOURCES OF TEXT

TECHNICAL FIELD

The invention relates to enterprise software systems, and more particularly, to accessing textual data maintained by enterprise software systems.

BACKGROUND

Enterprise software systems are typically sophisticated, large-scale systems that support many, e.g., hundreds or thousands, of concurrent users. Examples of enterprise software systems include financial planning systems, budget planning systems, order management systems, inventory management systems, sales force management systems, business intelligence tools, enterprise reporting tools, project and resource management systems, and other enterprise software systems.

Many enterprise performance management and business planning applications require a large base of users to enter data that the software then accumulates into higher level areas of responsibility in the organization. Moreover, once data has been entered, it must be retrieved to be utilized. The system may perform mathematical calculations on the data, combining data submitted by one user with data submitted by other users. Using the results of these calculations, the system may generate reports for review by higher management. Often these complex systems make use of multidimensional data sources that organize and manipulate the tremendous volume of data using data structures referred to herein as data cubes. Each data cube, for example, includes a plurality of hierarchical dimensions having levels and members for storing the multidimensional data.

Reporting and analysis end user products (typically referred to as Business Intelligence, or BI, tools) allow users to author reports and perform data exploration and analysis on a myriad of data sources including, primarily, relational and multi-dimensional databases, as well as flat files, Extensible Markup Language ("XML") data, data streams, and unorganized text and data. Executing an individual report or analysis by BI tools may include parsing and planning the query and then executing the query on the underlying data source, retrieving data from the underlying data source in response to the query, and returning the data to the BI tools. The BI tools may include an Online Analytical Processing (OLAP) interface for querying the multi-dimensional cubes.

SUMMARY

In one example, a method includes receiving a multidimensional query term on one or more selected sources of text in a data source; and executing a query on the one or more selected sources of text in the data source based on the multidimensional query term. The method further includes retrieving a query result set comprising elements of text responsive to the multidimensional query term from the one or more selected sources of text in the data source, generating a custom text document based at least in part on the query result set, and providing the custom text document via an output device.

In another example, a computing system includes one or more processors, one or more computer-readable tangible storage devices, a display device; and a user input device. The computing system also includes program instructions, stored on at least one of the one or more computer-readable tangible storage devices for execution by at least one of the one or more processors, to provide, via a user input device, a user interface for defining multidimensional query terms for sources of text. The computing system also includes program instructions, stored on at least one of the one or more computer-readable tangible storage devices for execution by at least one of the one or more processors, to receive, via the user interface, a multidimensional query term on one or more selected sources of text in a data source. The computing system also includes program instructions, stored on at least one of the one or more computer-readable tangible storage devices for execution by at least one of the one or more processors, to execute a query on the one or more selected sources of text in the data source based on the multidimensional query term. The computing system also includes program instructions, stored on at least one of the one or more computer-readable tangible storage devices for execution by at least one of the one or more processors, to retrieve a query result set comprising elements of text responsive to the multidimensional query term from the one or more selected sources of text in the data source. The computing system also includes program instructions, stored on at least one of the one or more computer-readable tangible storage devices for execution by at least one of the one or more processors, to generate a custom text document based at least in part on the query result set. The computing system also includes program instructions, stored on at least one of the one or more computer-readable tangible storage devices for execution by at least one of the one or more processors, to provide the custom text document via an output device.

In another example, a computer program product includes one or more computer-readable tangible storage devices and program instructions stored on at least one of the one or more computer-readable tangible storage devices. The computer program product includes program instructions, stored on at least one of the one or more computer-readable tangible storage devices, to provide, via a user input device, a user interface for defining multidimensional query terms for sources of text. The computer program product also includes program instructions, stored on at least one of the one or more computer-readable tangible storage devices, to receive, via the user interface, a multidimensional query term on one or more selected sources of text in a data source. The computer program product also includes program instructions, stored on at least one of the one or more computer-readable tangible storage devices, to execute a query on the one or more selected sources of text in the data source based on the multidimensional query term. The computer program product also includes program instructions, stored on at least one of the one or more computer-readable tangible storage devices, to retrieve a query result set comprising elements of text responsive to the multidimensional query term from the one or more selected sources of text in the data source. The computer program product also includes program instructions, stored on at least one of the one or more computer-readable tangible storage devices, to generate a custom text document based at least in part on the query result set. The computer program product also includes program instructions, stored on at least one of the one or more computer-readable tangible storage devices, to provide the custom text document via an output device.

The details of one or more embodiments are set forth in the accompanying drawings and the description below. Other features, objects, and advantages will be apparent from the description and drawings, and from the claims.

DETAILED DESCRIPTION

Figure 1:
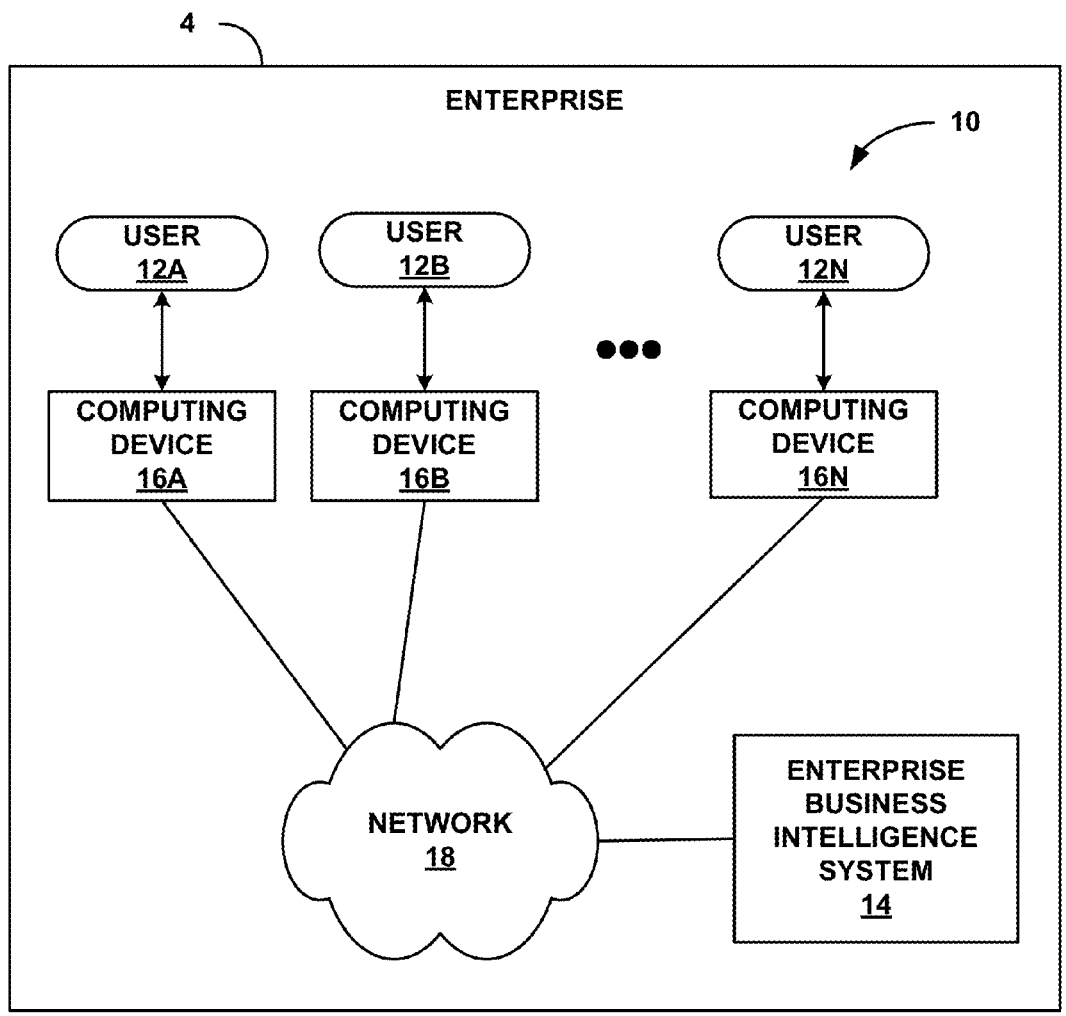
FIG. 1 is a block diagram illustrating an example enterprise having a computing environment in which a plurality of users interacts with an enterprise business intelligence system.

There are set forth herein examples of a method, computing system, and computer program product for providing an application and a user interface for defining multidimensional query terms for multidimensional text queries and generating custom text documents based on the multidimensional text queries on a computing device or in a computing environment. Various embodiments disclosed herein may enable users to use a multidimensional querying interface to perform multidimensional text queries on sources of text and generate custom text documents from the sources of text, among various other features and advantages. For example, a multidimensional text querying application may populate a multidimensional data store or data index with text, to provide OLAP-style filter, sort, and drag-and-drop tools to query the text on various dimensions, and to provide report-generation capability to receive, concatenate and format query results in a manner readable to the user, i.e., in a custom text document. This may include a multidimensional text querying application automatically generating a query suitable for querying data sources, using any suitable querying language, based on a user's OLAP-style inputs to a user interface for multidimensional text querying application 25B, thereby providing easier and more rapid authoring of custom text documents.

A multidimensional query term may be a query term having dimensional inputs or filter terms, and/or dimensional outputs or result sets. For example, an input multidimensional query term may be filtered on discrete values of dimensionsal columns, e.g. "WHERE [Category].[Sporting Goods]" rather than e.g. "WHERE [Measures].[Current Price]>100" (as an example illustratively using the MDX query language, though other query languages may also be used). As an example of an output multidimensional query term, a query may have a dimensional result set such that results are indexable on one or more independent axes, e.g., "SELECT [Months] on ROWS, [Category] on COLUMNS" (again illustratively using the MDX query language for this example).

As one illustrative advantage, a multidimensional text querying application as disclosed herein may solve the problem of maintaining and accessing an enterprise body of textual data stored in relational databases or hierarchical documents in a hierarchical file system. Because data can be multidimensional, all text relating to a subject is not necessarily contiguous in such a system. A multidimensional text querying application as disclosed herein may enable users to generate custom documents ad-hoc from a data store or data index of text.

A classical document, either in print or online, may be considered as a one-dimensional representation of a body of text; words are ordered from first to last. To make navigation easier, documents are commonly organized into a hierarchy of sections and subsections, such as in a table of contents. Typically, the ordering of the elements of the document is decided by author at the time of writing. Organization can be a difficult task for an author when a body of text can be subdivided into categories in a number of ways. For example, a body of text on customer feedback (such as complaints) could be organized according to product line, geographical region, time period, language of customer feedback, or order method. The author of a customer feedback report must also decide what data to include, for example, whether the document should include only local, regional or global complaints. Normally, the author assigns the top-level sections to the category deemed most important and the deepest level of subsection to the least important category, for example as follows:

| Customer Complaints - 2011 - English - Table of Contents |
|---|
| 1) Stoves |
| 1.1) USA |
| 1.1.1) Online |
| 1.1.2) In-store |
| 1.1.3) Mail-order |
| 1.2) Canada |
| 1.2.1) Online |
| 1.2.2) In-store |
| 1.2.3) Mail-order |
| 2) Fridges |
| 2.1) USA |
| 2.1.1) Online |
| 2.1.2) In-store |
| 2.1.3) Mail-order |
| 2.2) Canada |
| 2.2.1) Online |
| 2.2.2) In-store |
| 2.2.3) Mail-order |

This may be part of a document that also repeats the same classifications in separate categories for customer feedback received in French and in Spanish, and in separate categories for each year. The document may also include countless other products, and may also include separate geographical subsections for states and provinces or smaller areas within the geographical sections for USA and Canada, and may include separate time period sub-sections within each year. If the reader is interested only in parts of the document, such as complaints from a certain region, then the reader will have a significant burden navigating within the document to each of the listings for that region within all the other organizational structure. This difficulty stems from the one-dimensional ordering of a multidimensional body of text. A classical document may therefore contain sections that aren't relevant to a given reader.

A multidimensional text querying application as disclosed herein may enable users to generate custom text documents ad-hoc from an underlying source of text, where the custom text document is tailored among multiple dimensions to provide only the information relevant to a given user at a given time. Various illustrative features and advantages of a multidimensional text querying application are further described below with reference to FIGS. 1-6.

FIG. 1 illustrates an example context in which techniques disclosed herein may be used. FIG. 1 is a block diagram illustrating an example enterprise 4 having a computing environment 10 in which a plurality of users 12A-12N (collectively, "users 12") interact with an enterprise business intelligence system 14. In the system shown in FIG. 1, enterprise business intelligence system 14 is communicatively coupled to a number of computing devices 16A-16N (collectively, "computing devices 16") by a network 18. Users 12 interact with their respective computing devices to access enterprise business intelligence system 14.

For exemplary purposes, one example of the techniques of this disclosure is described in reference to an enterprise business intelligence system, such as an enterprise order management system or project and resource management systems. The techniques described herein may be readily applied to other software systems, including other large-scale enterprise software systems. Examples of enterprise software systems include financial or budget planning systems, inventory management systems, sales force management systems, business intelligence tools, enterprise reporting tools, and other enterprise software systems.

Typically, users 12 view and manipulate multidimensional data via their respective computing devices 16. The data is "multidimensional" in that each multidimensional data element is defined by a plurality of different object types, where each object is associated with a different dimension. Users 12 may, for example, use a multidimensional querying interface, such as an Online Analytical Processing (OLAP) interface, for querying the multidimensional data to retrieve data related to store sales by entering a name of a sales person, a store identifier, a date, a product, and a price at which the product was sold, into their respective computing devices 16. Techniques of the present disclosure also enable users 12 to use a multidimensional querying interface, such as an Online Analytical Processing (OLAP) interface, for performing multidimensional text queries on sources of text available in enterprise business intelligence system 14 and generating custom text documents from the sources of text.

Enterprise users 12 may use a variety of different types of computing devices 16 to interact with enterprise business intelligence system 14 via network 18. For example, an enterprise user 12 may interact with enterprise business intelligence system 14 using a laptop computer, desktop computer, or the like, running a web browser, such as Internet Explorer™ from Microsoft Corporation of Redmond, Wash. Alternatively, an enterprise user may use a smartphone, running either a web browser or a dedicated smartphone application for interacting with enterprise business intelligence system 14.

Network 18 represents any communication network, such as a packet-based digital network like a private enterprise intranet or a public network like the Internet. In this manner, computing environment 10 can readily scale to suit large enterprises. Enterprise users 12 may directly access enterprise business intelligence system 14 via a local area network, or may remotely access enterprise business intelligence system 14 via a virtual private network, remote dial-up, or similar remote access communication mechanism.

Figure 2:
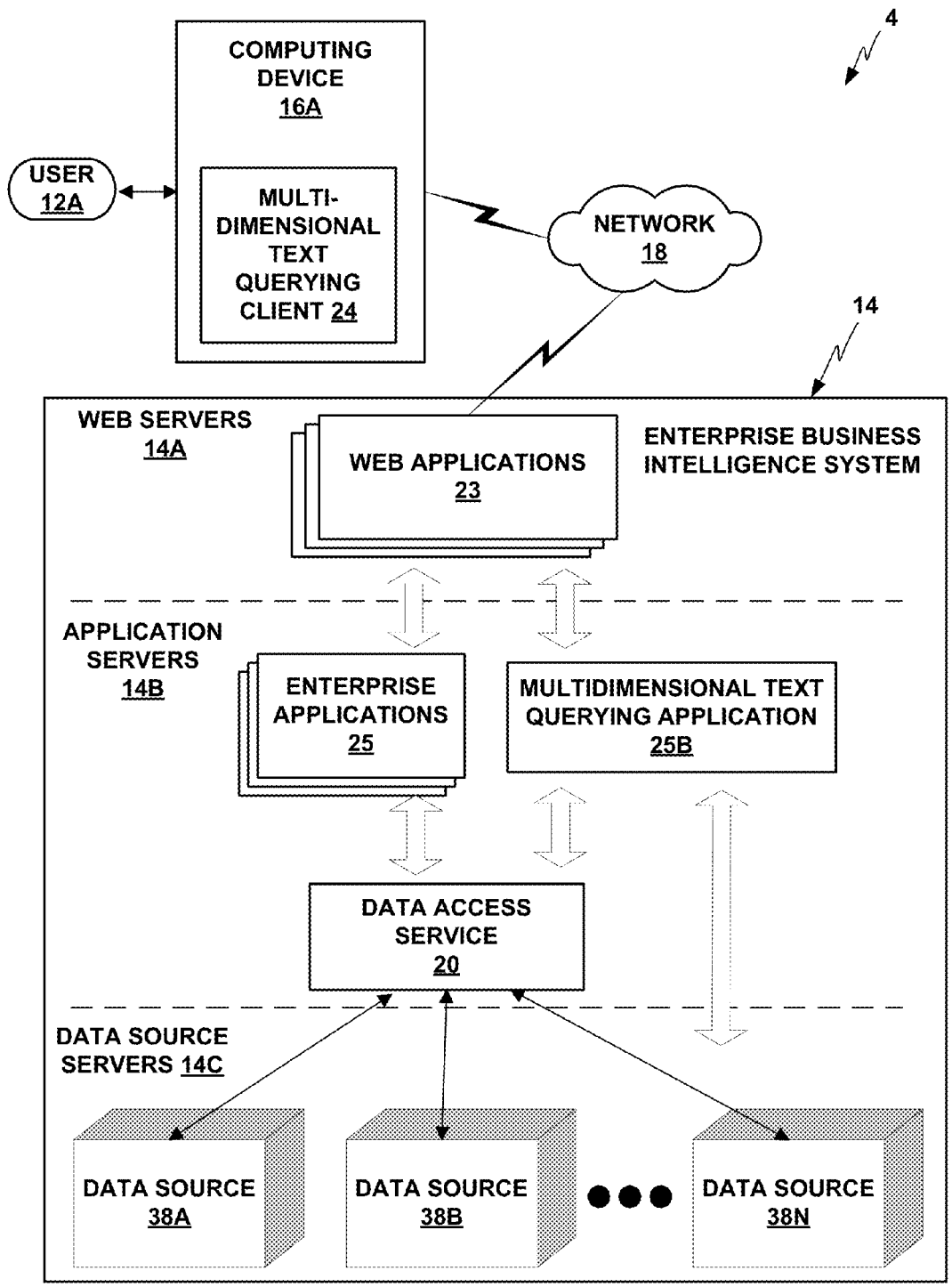
FIG. 2 is a block diagram illustrating an example enterprise business intelligence system with a multidimensional text querying and document generating application.

FIG. 2 is a block diagram illustrating in further detail portions of one embodiment of an enterprise business intelligence system 14. Enterprise business intelligence system 14 is implemented in accordance with a three-tier architecture: (1) one or more web servers 14A that provide user interface functions; (2) one or more application servers 14B that provide an operating environment for business logic and enterprise software applications 25, including multidimensional text querying application 25B; (3) and one or more data source servers 14C. The data source servers 14C host data sources 38A, 38B, . . . 38N ("data sources 38A-38N") which may include relational databases and/or multidimensional databases. The data sources 38A-38N may be implemented using a variety of vendor platforms, and may be distributed throughout the enterprise.

As one example, the data sources 38A-38N may include multidimensional databases configured for Online Analytical Processing (OLAP). As another example, the data sources 38A-38N may include multidimensional databases configured to receive and execute Multidimensional Expression (MDX) queries of some arbitrary level of complexity. As yet another example, the data sources 38A-38N may include two-dimensional relational databases configured to receive and execute SQL queries, also with an arbitrary level of complexity. Some of data sources 38A-38N may include other types of data stores or combine aspects of multiple types of data stores.

As described in further detail below, the multidimensional text querying application 25B may issue multidimensional text queries on one or more selected sources of text in data sources 38A-38N according to user-selected dimensions and/or filters, and transform the query result sets to generate custom text documents. Enterprise business intelligence system 14 includes a data access service 20 that provides a logical or easy-to-query interface to the data sources 38A-38N. The data access service 20 may, for example, execute on the application servers 14B intermediate to the enterprise applications 25 and the underlying data sources 38A-38N. The data access service 20 permits the enterprise software applications 25 and multidimensional text querying application 25B to issue input queries to multidimensional data sources 38A-38N without regard to particular MDX features implemented by each of the underlying data sources. The data access service 20 enables the underlying data sources 38A-38N to perform MDX functions that they support, for example. The multidimensional text querying application 25B may use data access service 20 to retrieve query result sets from the underlying data sources 38A-38N.

In the example implementation depicted in FIG. 2, a single client computing device 16A is shown for purposes of example. Client computing device 16A includes a multidimensional text querying client 24 configured for interacting with, and rendering a user interface for, multidimensional text querying application 25B. Multidimensional text querying application 25B running on one or more of application servers 14B may provide the underlying user interface for defining multidimensional query terms for sources of text to multidimensional text querying client 24 running on client computing device 16A, such as in that multidimensional text querying application 25B provides the data for the client-side rendering of the user interface for multidimensional text querying client 24.

Multidimensional text querying application 25B may also include, or provide the back end or other data for a web application that multidimensional text querying client 24. Enterprise business intelligence system 14 includes one or more web servers 14A that provide an operating environment for web applications 23 that provide user interface functions to user 12A and computer device 16A. One or more application servers 14B provide an operating environment for enterprise software applications 25 and multidimensional text querying application 25B that access multidimensional data sources 38A-38N through data access service 20.

Data sources 38 may represent multidimensional data sources which store information organized in multiple dimensions, for example. Data on multidimensional data sources 38 may be represented by a "data cube," a data organization structure capable of storing data logically in multiple dimensions, potentially in excess of three dimensions. In some examples, these data sources may be databases configured for Online Analytical Processing ("OLAP"). In various examples, these data sources may be vendor-supplied multidimensional databases having OLAP processing engines configured to receive and execute multidimensional queries.

As shown in FIG. 2, multidimensional text querying application 25B provides an interface to the data sources 38. Multidimensional text querying application 25B exposes a consistent, rich set of multidimensional querying functions to multidimensional text querying client 24, for each of multidimensional data sources 38 regardless of the specific multidimensional querying functions implemented by the particular data source as well as any vendor-specific characteristics or differences between the data sources. As shown in FIG. 2, multidimensional text querying application 25B also directly accesses data sources 38A-38N for certain functions, as shown in FIG. 3 and described below.

Figure 3:
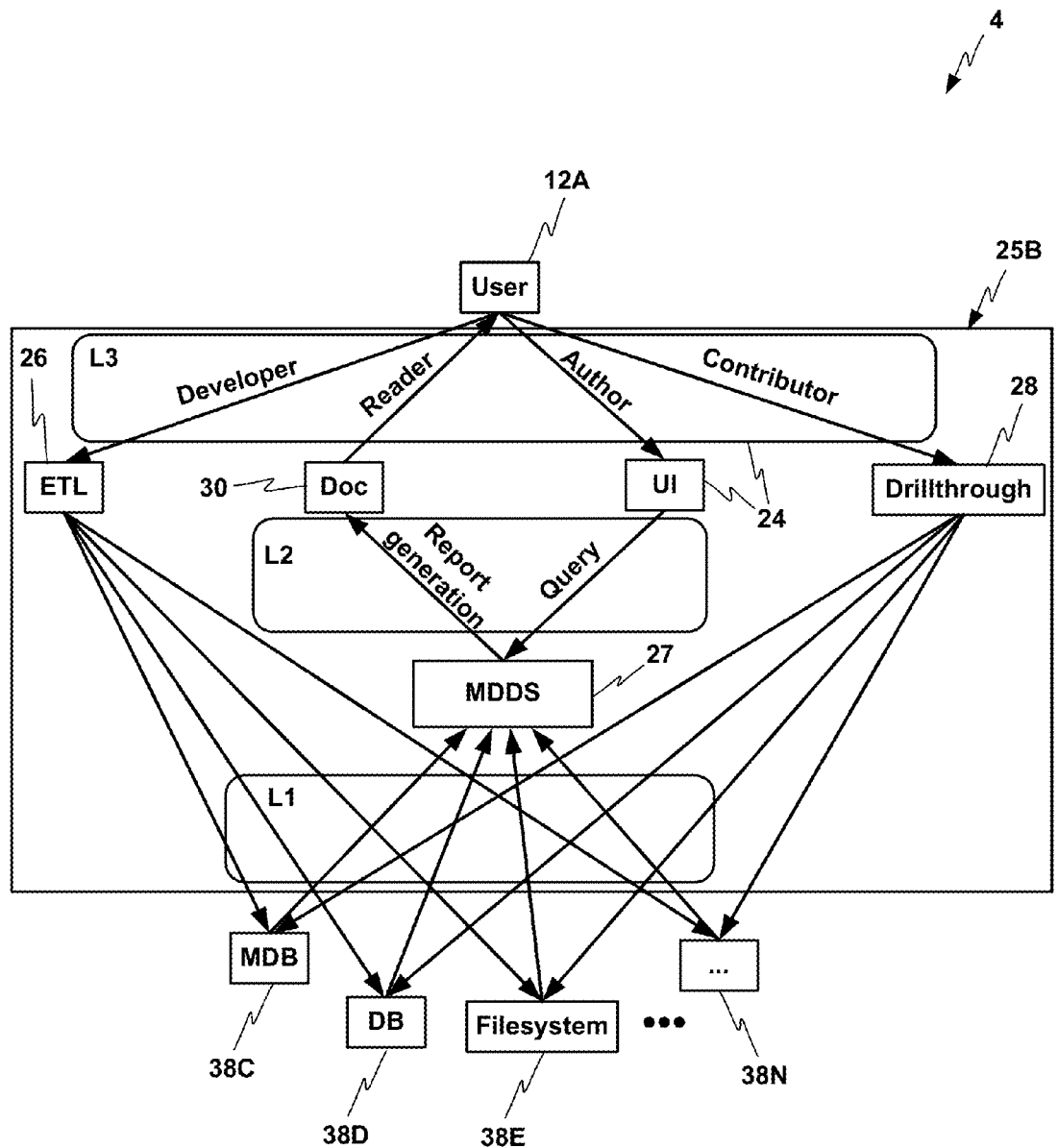
FIG. 3 is a conceptual diagram illustrating an example multidimensional text querying and document generating application operating in an enterprise business intelligence system.

FIG. 3 is a conceptual diagram illustrating an example multidimensional text querying and document generating application 25B operating in an enterprise business intelligence system 14, analogous to enterprise business intelligence system 14 as depicted in FIG. 2. Data sources 38C, 38D, 38E, 38N ("data sources 38C-38N"), and other data sources may have bodies of text information stored therein, and may serve as sources of text. Multidimensional text querying application 25B may maintain a multidimensional index or store that it may synchronize with bodies of text information stored in data sources 38C-38N. Multidimensional text querying application 25B includes query engine that retrieves text from data sources 38C-38N via the multidimensional index or store via a multidimensional query. Multidimensional text querying application 25B includes an intermediate multidimensional data store or index 27 ("MDDS 27") that multidimensional text querying application 25B may use in retrieving elements of text relevant to the query from the data sources 38C-38N.

The intermediate multidimensional data store or index 27 may include data that has been extracted from the data sources 38C-38N, transformed from any of a diverse range of different data types, such as multidimensional databases, relational databases, XML files and other flat files, into a conforming multidimensional format, and loaded into MDDS 27, in an earlier extract/transform/load (ETL) procedure, as further described below. Multidimensional text querying application 25B may execute a query on the one or more selected sources of text in the data source based on the multidimensional query term by executing the query on the MDDS 27, and retrieving a query result set comprising elements of text responsive to the multidimensional query term from the one or more selected sources of text in the data source, as stored in the conformed multidimensional format in the MDDS 27, in various examples. MDDS 27 may therefore abstract away the differences in data types of the different sources of text, and provide a holistic view of all the data sources in the enterprise 4.

Multidimensional text querying application 25B enables executing a multidimensional query term on either a single source of text multiple sources of text, in various examples. For example, an author may wish to compose a report combining different data sources that store data for Customer Complaints, Employee Interventions, and Product Returns, organized by Store. These three data types may share some dimensions, such as store, but differ in other dimensions. MDDS 27 may facilitate retrieving the data from each of these data sources by either storing or indexing the data in a single intermediate conformed multidimensional form on which to execute the multidimensional query term. Multidimensional text querying application 25B may also include a report generation component that may receive, concatenate, format, and provide a custom text document 30 to be displayed to a reader. Multidimensional text querying application 25B may also provide a user interface that allows a report author to adjust a multidimensional query using OLAP tools such as filter, sort, and drag-and-drop tools. Multidimensional text querying application 25B may also dynamically create a hierarchical table of contents as shown in paragraph 20 or otherwise dynamically generate a hierarchical navigation guide for the document.

In some examples, multidimensional text querying application 25B may also track an association between a custom text document 30 and the one or more selected sources of text in the data source, and provide a drill-through feature 28 that enables a user to quickly look up the source in the underlying source of text in data sources 38C-38N for an element of text in the custom text document 30. That is, the drill-through feature may enable the custom text document 30 with a user-selectable option to select a portion of the custom text document and access a corresponding portion of the one or more selected sources of text in the data source. For example, multidimensional text querying application 25B may generate custom text documents that contain drill-through metadata. Contributor users may access the drill-through metadata in a custom text document to locate the source of rendered text from the custom text document in the underlying source of text in data sources 38C-38N.

This drill-through feature may also enable the user to modify or add to the underlying source of text. That is, the drill-through feature may enable the custom text document with a user-selectable option to add a new portion of text to the custom text document. Then, when the drill-through feature receives a new portion of text added to the custom text document, it may store the new portion of text in association with the one or more selected sources of text in the data source.

Multidimensional text querying client 24 supports a number of different user roles in interacting with multidimensional text querying application 25B, including user roles as a developer, a reader, an author, and a contributor, as depicted in FIG. 3. User roles are identified here to categorize various advantages of using multidimensional text querying application 25B for maintaining and accessing an enterprise-wide body of text compared to disparate flat files and databases. A reader is a user who reads a custom text document generated with multidimensional text querying application 25B. The reader benefits because they do not have to skip within the document to find interesting parts; the document has been custom-made for them by the author.

An author uses multidimensional text querying application 25B to generate a custom text document. For example, an author may use OLAP-style tools in multidimensional text querying application 25B on an underlying source of text to filter out uninteresting text and to organize interesting text. For example, a report author could be charged with creating or modifying a document called "Customer complaints in 2010". Using multidimensional text querying application 25B, the author can create a new report or change an existing report based on a larger, more broadly based source of text. The author creates or modifies a multidimensional query in multidimensional text querying application 25B to generate the ad-hoc, custom text document. The author may also control the settings of a presentation layer, for how the multidimensional text querying application 25B transforms a query result set from the user's multidimensional query to generate a custom text document. Multidimensional text querying application 25B may also enable a custom text document to be generated as a fragment that may be integrated into a larger document.

An author may also use multidimensional text querying application 25B to save a multidimensional query term for the one or more selected sources as a template. Then, subsequent to providing the original custom text document based on the query term, the author or any other user may enter an input for generating an updated custom text document. Multidimensional text querying application 25B responds to receiving this input by executing a new query on the one or more selected sources of text in the data source based on the saved multidimensional query term, retrieving an updated query result set comprising potentially updated elements of text responsive to the saved multidimensional query term from the one or more selected sources of text in the data source, and transforming the updated query result set to generate an updated custom text document. Multidimensional text querying application 25B may thereby generate an updated text document with updated text entries from the data source, that may have been updated, potentially more than once, since the multidimensional query term was originally authored. A user therefore does not need to enter additional input to generate an updated custom text document from a template. Multidimensional text querying application 25B then provides the updated custom text document via an output device.

As shown in FIG. 3, multidimensional text querying application 25B may be thought of as enabling an author-specific feedback loop. This may be advantageous over classical authoring because an author may not need to navigate the enterprise's file systems and databases to look for relevant text-based subject matter; the sources of text are already indexed with multidimensional text querying application 25B. The author may use OLAP-style report generation UI tools, such as filter, sort, and drag-and-drop, to customize an existing report into a custom text document, instead of having to write a query in a query language such as SQL or MDX. For example, the report generation UI may include drag and drop features for MDX query term clauses such as the ROWS axis SELECT clause, the COLUMNS axis SELECT clause, the FROM clause, and the WHERE clause of an MDX query. Multidimensional text querying application 25B may automatically generate a query suitable for querying any of the underlying data sources 38C-38N, using any suitable querying language, based on the user's OLAP-style inputs to the UI, thereby providing easier and more rapid authoring of a custom text document.

Another role indicated in the multidimensional text querying client 24 is a contributor. A contributor is a user who uses the drill-through feature 28 to add to or edit the body of text, and is usually an expert on the subject matter. The contributor may also edit a schema for an underlying data source, for example, by adding or removing members from dimensions. A contributor may add text to a selected source of text in the data source in only a single place and then set the appropriate categories to control what custom text documents the newly added text may appear in. Changes to source text may then automatically be reflected in custom text documents derived from that selected source of text. The contributor's productivity is increased by being able to write or edit a section of text once and have it thereafter available for frequent re-use in a potentially large number of custom documents. In comparison, a contributor to a classical document would have to navigate and find all documents that the change pertains to. Multidimensional text querying application 25B enables an author to add or edit raw content in any of various specialized, immutable or legacy systems, with multidimensional text querying application 25B automatically handling any needed transformation of the raw content into a specialized data structure suitable for the underlying data source, such as structured text or XML, rather than requiring a contributor to convert the content into the appropriate data structure.

Multidimensional text querying application 25B also provides ETL tool 26, which enables Extraction, Transformation and Loading (ETL). A user who controls or configures the ETL tool 26 may be considered as filling the role of a developer. A developer is a user who maintains the multidimensional index or store and ETL code that multidimensional text querying application 25B uses to query the data sources 38C-38N. The developer does not need to know about the subject matter of the information in the sources of text, and neither do authors need to know about how synchronization is achieved. A developer may access a separate feedback loop that allows them to transparently change, for example, the location of a database 38D from among data sources 38C-38N, while that change in location of the database 38D is updated in the index of multidimensional text querying application 25B. Multidimensional text querying application 25B therefore abstracts away the change in location of the database 38D from any awareness of users who are only interested in using multidimensional text querying application 25B as readers, authors, or contributors, instead of forcing those non-developer users to track down the changing locations of underlying data sources.

As shown in FIGS. 2 and 3, multidimensional text querying application 25B includes features such as ETL tool 26 and drill-through feature 28 that may directly access underlying data sources 38C-38N, such as for ETL tool 26 to update the index of multidimensional text querying application 25B and synchronize the index with the data sources 38C-38N. Multidimensional text querying application 25B may use its index and the data sources 38C-38N as a two-layered system of an index/store layer and a source layer, with one-directional synchronization from the source layer to the index/store layer, rather than just a single layer of structured text. Multidimensional text querying application 25B may write to the data sources 38C-38N in the source layer, and read from the index/store layer.

This configuration provides a number of advantageous features. For example, it allows the enterprise 4 to keep and leverage any specialized, immutable or legacy data stores, which may include many diverse computer systems with diverse data schemas and directory structures, among data sources 38C-38N; it provides a quick response from the dedicated store/index; and it allows developers to perform maintenance on data sources 38C-38N without impacting readers or authors.

Multidimensional text querying application 25B may use a multidimensional database for its index. The multidimensional database may use star schemas, with text stored in or linked to by fact tables. Report author users may use the multidimensional text querying application 25B to define and maintain the dimensions. Developer users may control or configure the ETL tool 26 of multidimensional text querying application 25B to populate the multidimensional database index from the file systems, relational databases, multidimensional databases, or any other data sources among data sources 38C-38N, and thereby synchronize the multidimensional database index of the multidimensional text querying application 25B with the data sources 38C-38N. For example, multidimensional text querying application 25B may provide a developer user interface that enables tagging sections of a given source of text with dimensional tags, and storing the dimensional tags in association with the given source of text in the data source, to be available for subsequent queries.

When multidimensional text querying application 25B receives a new source of text, it may generate a multidimensional index for the first source of text, either by its own analysis or with inputs from a developer. When this source of text is selected as the selected source of text for a multidimensional query term, multidimensional text querying application 25B may compare the multidimensional query term with its multidimensional index to execute the query.

The techniques described herein make reference to the MDX query language and SQL query language, as MDX and SQL are currently the most prominent multidimensional data query language and relational database query language, respectively. However, the techniques described herein may be applied to other structured languages capable of querying any type of data structures. The examples used herein reference MDX and SQL but should not be understood to limit the application of the invention to MDX and SQL, as the techniques may be applied to any data querying language or tool, and any type of query result set.

The separation of roles or functions among multidimensional text querying application 25B and multidimensional text querying client 24 as depicted in FIGS. 2 and 3 are illustrative examples, while other examples may include any kind of division of functions among a server-side application and a client-side interface, or may consolidate all multidimensional text querying application functions in a single application running on a single device. In other examples, any of the features described above may be considered part of multidimensional text querying application 25B, which may include features, modules, libraries, client programs, and/or various other aspects distributed among various components, devices, or systems.

Figure 4:
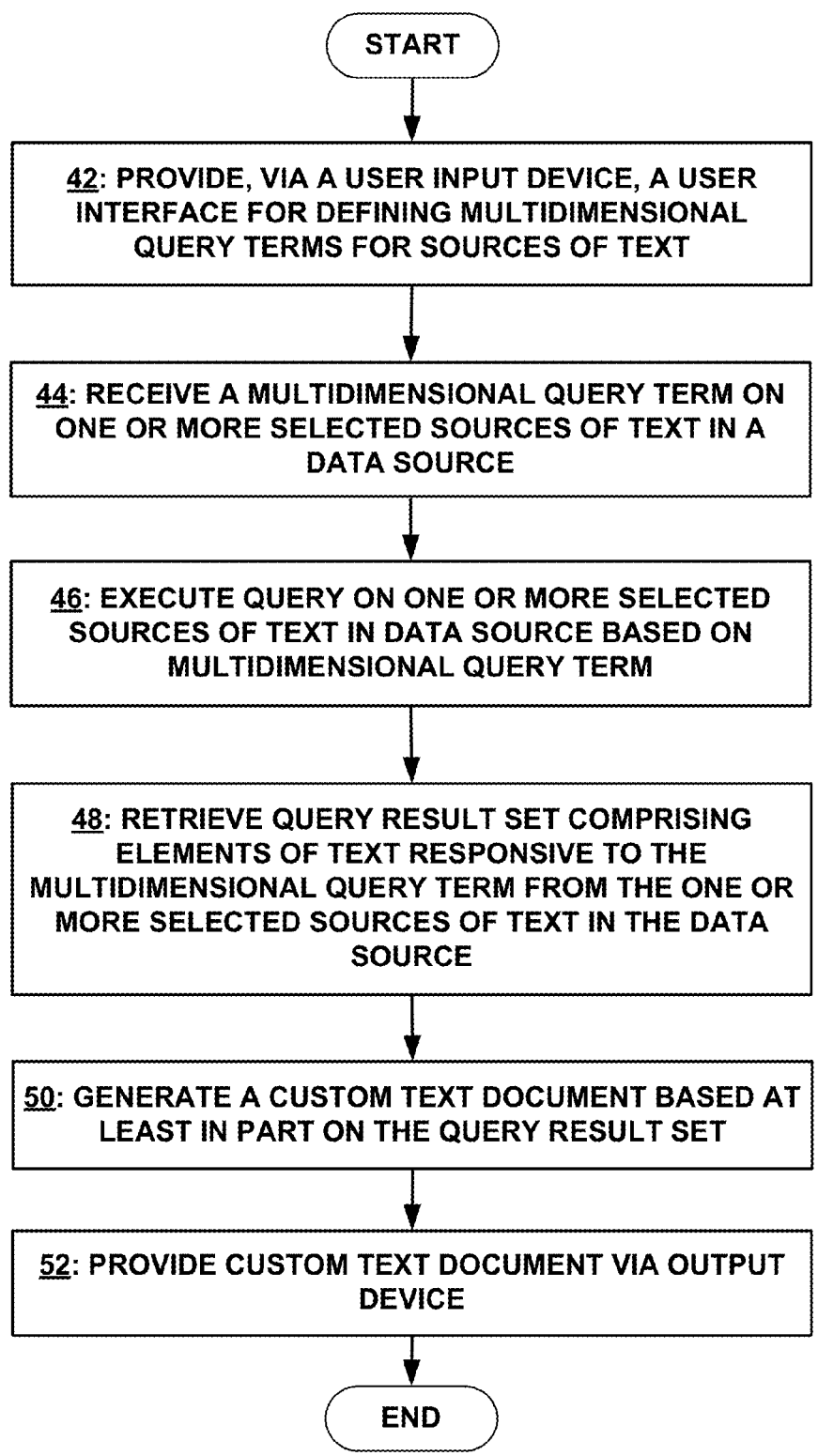
FIG. 4 is a flowchart illustrating operation of an example method for performing multidimensional text queries to generate custom documents.

FIG. 4 is a flowchart illustrating operation of an example method 40 for performing multidimensional text queries to generate custom documents, such as may be performed by multidimensional text querying application 25B depicted in FIGS. 2 and 3. Multidimensional text querying application 25B may provide, via a user input device such as computing device 16A, a user interface for defining multidimensional query terms for sources of text among data sources 38C-38N, which may include computer files, relational databases, multidimensional databases, or any other data store (42). The user interface may provide multidimensional query tools, such as OLAP-style tools, that enable a report author to create or modify the multidimensional query. Multidimensional text querying application 25B may provide the user interface via the user input device in the sense that it provides data, via an output component, used to render or populate the user interface at the client computing device. Multidimensional text querying application 25B may run entirely on a single server or other computing device, for example, and send the data via a network interface or other output component for rendering or populating the user interface at the client computing device, for example.

Multidimensional text querying application 25B may receive from the user, via the user interface, a multidimensional query term on one or more selected sources of text in one of data sources 38C-38N (44), and execute a query on the one or more selected sources of text in the data source based on the multidimensional query term (46). Again, multidimensional text querying application 25B may run entirely on a single server and receive the query term via the user interface in the sense that it receives data originally entered via the user inputs, which may be transported over a network or other communication structure to a device running multidimensional text querying application 25B. Multidimensional text querying application 25B may include a multidimensional index or store that is synchronized with bodies of text in the data sources 38C-38N, including the one or more selected sources of text. Multidimensional text querying application 25B may include a query engine that fetches text from the multidimensional index or store via a multidimensional query. Multidimensional text querying application 25B retrieves a query result set, such as by using a query engine that fetches elements of text from the multidimensional index or store via a multidimensional query, responsive to the multidimensional query term from the one or more selected sources of text in the data source (48).

Multidimensional text querying application 25B then generates a custom text document based at least in part on the query result set (50). For example, multidimensional text querying application 25B may transform the query result set to generate a custom text document, such as with a report generation component that receives, concatenates, and formats the text from the query result set into a format suitable for displaying, such as by generating an HTML document, for example. Multidimensional text querying application 25B then provides the custom text document via an output device (52), which may include displaying the text as a document to be viewed on a computing device, possibly with vertical scrolling or pagination, and with possibly hierarchical navigation. Providing the custom text document via an output device may also include sending the custom text document to a file or a printer, for example. Providing the custom text document via an output device may be done from multidimensional text querying application 25B running on a single server or other device, that provides the data via a network interface or other output component for rendering the custom text document at the client computing device.

The multidimensional query user interface for multidimensional text querying application 25B, as presented on multidimensional text querying client 24 as shown in FIG. 2, may enable an author to control and customize a custom text document. For example, the multidimensional query user interface may include a filter component that enables a user to select some categories from some dimensions to display, an ordering component that orders the members within a dimension, and a hierarchy component that controls the hierarchical organization of dimensions, for example. The multidimensional query user interface may also enable a drag-and-drop feature for drag-and-drop authoring, enabling a user to rapidly modify a query by selecting and dragging graphical elements representing filters or other control factors from the schema into a row area, a column area, or a filter area. An example of this is depicted in FIG. 5.

Figure 5:
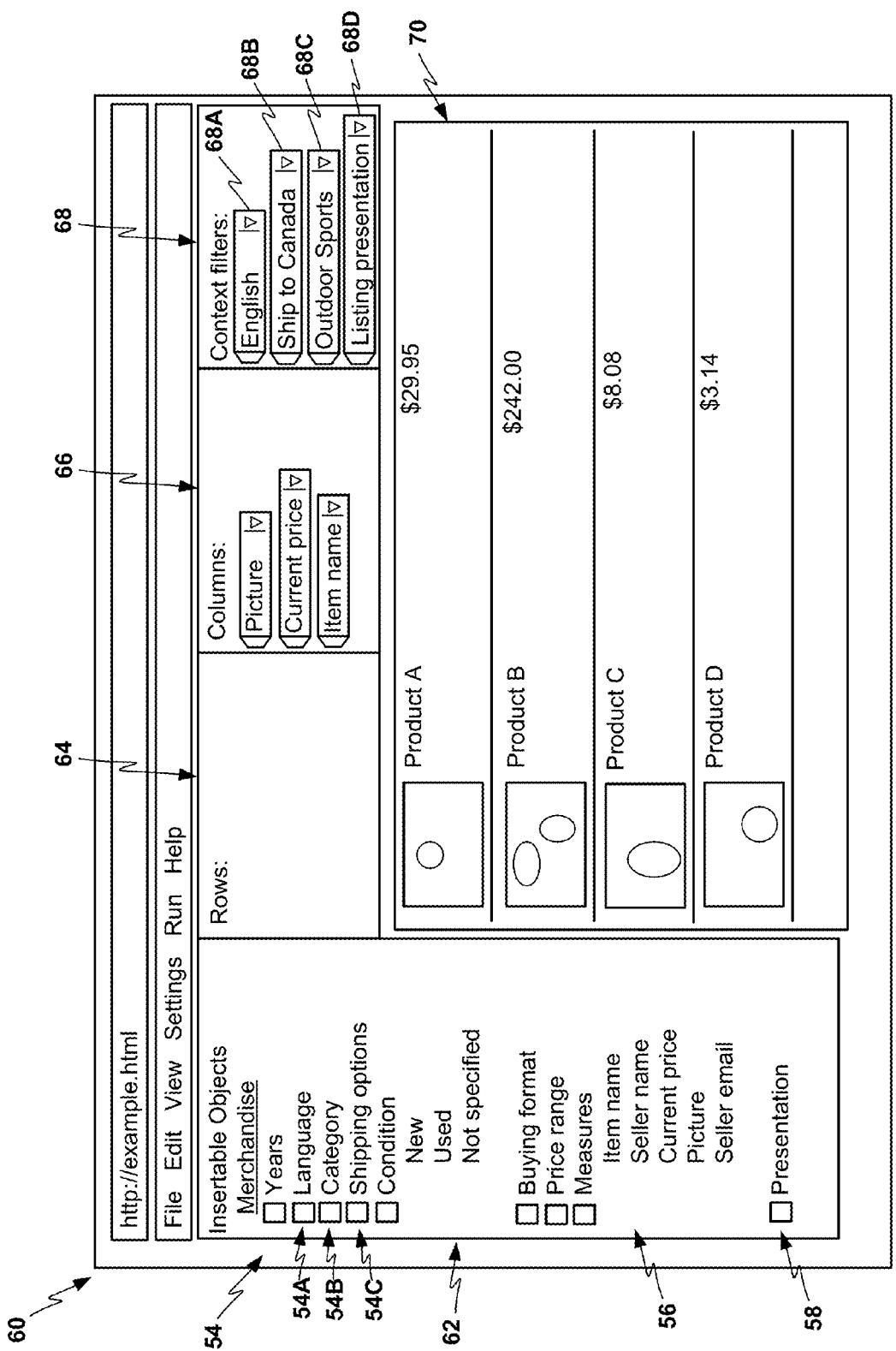
FIG. 5 depicts a screenshot of an example multidimensional text querying user interface with a portion of a resulting custom text document as it may be displayed on a computing device display screen.

FIG. 5 depicts a screenshot of a multidimensional text querying user interface 60, in particular a dimensional, OLAP-style schema user interface for multidimensional text queries, as it may be displayed in multidimensional text querying client 24 on client computing device 16A as shown in FIG. 2. Multidimensional text querying user interface 60 may be applied for generating custom text documents for an example e-commerce system, in the example of FIG. 5. Multidimensional text querying user interface 60 may be used to rapidly and easily create customized web pages or catalog pages showing different groupings of products for sale, drawing on data from any of a variety of disparate data sources, in this example.

Multidimensional text querying user interface 60 includes schema 62 with a measure GUI element 56 and a dimension GUI element 54. Measure GUI element 56 includes a list of measures associated with a fact table, and dimension GUI element 54 includes a list of dimensions associated with a dimension vector, which are applicable to the selected source of text. Schema 62 provides user options for selecting from among the dimensions and members for defining a multidimensional query term. Multidimensional text querying user interface 60 also includes row area 64, column area 66, filter area 68, and custom text document area 70. Row area 64 and column area 66 provide user-selectable options for assigning the members in dimension GUI element 54 to formatting options for a custom text document, and filter area 68 provides user-selectable options for filtering the members of selected dimensions for defining a multidimensional query term.

Custom text document area 70 shows a portion of a custom text document that may result from a multidimensional text query, as it may be displayed on a computing device display screen. That is, the custom text document shown in custom text document area 70 may be created and then used for a web page or a catalog page for an e-commerce website or a catalog, while the surrounding elements of multidimensional text querying user interface 60 are user interface elements for the user of the multidimensional text querying application 25B for creating queries to generate the resulting custom text document.

Schema 62 also includes presentation option 58, for implementing a selected custom format for the multidimensional text querying application 25B to transform a query result set into for presentation as a finalized, formatted custom text document. Dimension GUI element 54 includes a number of dimensions, each of which are indicated by a square, and which include Years, Language, Category, Shipping Options, Condition, Buying format, Price range, Measures, and Presentation. Each of these dimensions may be expanded to show various options or collapsed again, and many of which include several hierarchies of members that may be expanded and selected among. Measure GUI element 56 is shown in expanded form. The fact table underlying schema 62 may include a large number of columns, which may be defined in terms of fkeys, variable character fields, etc., including Merchandise Table, LanguageId fkey, CategoryId fkey, ShippingOptionsId fkey, ConditionId fkey, BuyingFormatId fkey, PriceRangeId fkey, ItemName varchar, SellerName varchar, CurrentPrice double, Picture blob, SellerEmail varchar, etc. Schema 62 also includes presentation option 58 for a PresentationId fkey, which may be considered a meta-dimension, in that it controls formatting parameters rather than data query parameters. These presentation parameters may be applied in formatting, such as in either the L2 or L3 layers as depicted in FIG. 3 since both the L2 and L3 layers may be applied to the results of the MDDS 27, to format data according to different presentation modes. Multidimensional text querying application 25B may therefore apply formatting parameters comprised in the multidimensional query term to the query result set as part of generating a custom text document based on the query result set.

Multidimensional text querying user interface 60 may be enabled for a drag-and-drop interface, so that a user is enabled to select a graphical element from among any of the members in dimension GUI element 54 or measures in measure GUI element 56 and drag the graphical element representing that member or measure into one of the graphical sections of row area 64, column area 66, or filter area 68. Row area 64, column area 66, and filter area 68 are graphical sections of multidimensional text querying user interface 60 that represent a multidimensional query term, such that multidimensional text querying user interface 60 thereby enables a user to use simple drag-and-drop graphical elements to define a multidimensional query term.

As depicted in FIG. 5, a user has selected graphical elements representing the measures for "picture", "current price", and "item name" from measure GUI element 56, and dragged and dropped them into the graphical UI section of column area 66. As seen in custom text document area 70 showing a representative portion of a custom text document, the document shows pictures, item names, and current prices for certain elements of text, representing various products, that were returned by a query that was defined in part by the measures selected for entry to measure GUI element 56. The results of the query also depended on the dimensions added to filter area 68.

The user has also selected graphical elements representing various dimensions from dimension GUI element 54 of schema 62, and dragged and dropped the dimension graphical elements into the graphical UI section of filter area 68. In particular, the user has selected a graphical element for a single language member, "English", from a "Languages" dimension 54A, and included the "English" dimension graphical element 68A in filter area 68. The "Languages" dimension 54A is shown in collapsed form in the view of FIG. 5, while it may also be selected to be expanded to show a number of language dimensions, one of which is "English", and may also include language dimensions for "French", "Spanish", etc., for example.

The user has also selected a graphical element for a single member from the "Shipping options" dimension 54C from dimension GUI element 54, a "Ship to Canada" member graphical element 68B, and dragged and dropped it into filter area 68. The user has further selected a graphical element for a single member from the "Category" dimension 54B from dimension GUI element 54, an "Outdoor Sports" member graphical element 68B, and dragged and dropped it too into filter area 68. Additionally, the user has selected a "Listing presentation" member graphical element 68D from "Presentation" dimension 58 for inclusion in filter area 68.

Once the user dragged and dropped the graphical elements for the selected dimension members and measures from the schema 62 into the selected graphical sections 64, 66, 68, the user was then able to run the multidimensional text querying application 25B, which interpreted the selections of dimension members and measures in graphical sections 64, 66, 68 as a multidimensional query term on a selected source of text in a data source. Multidimensional text querying application 25B then automatically executed a query on the selected source of text in the data source based on that multidimensional query term, retrieved a query result set comprising elements of text responsive to the multidimensional query term from the selected source of text in the data source, and transformed the query result set to generate a custom text document, such as by concatenating and formatting the retrieved query result set. Multidimensional text querying application 25B then provided the custom text document in custom text document area 70 via the display screen of the user's computing device.

Figure 6:
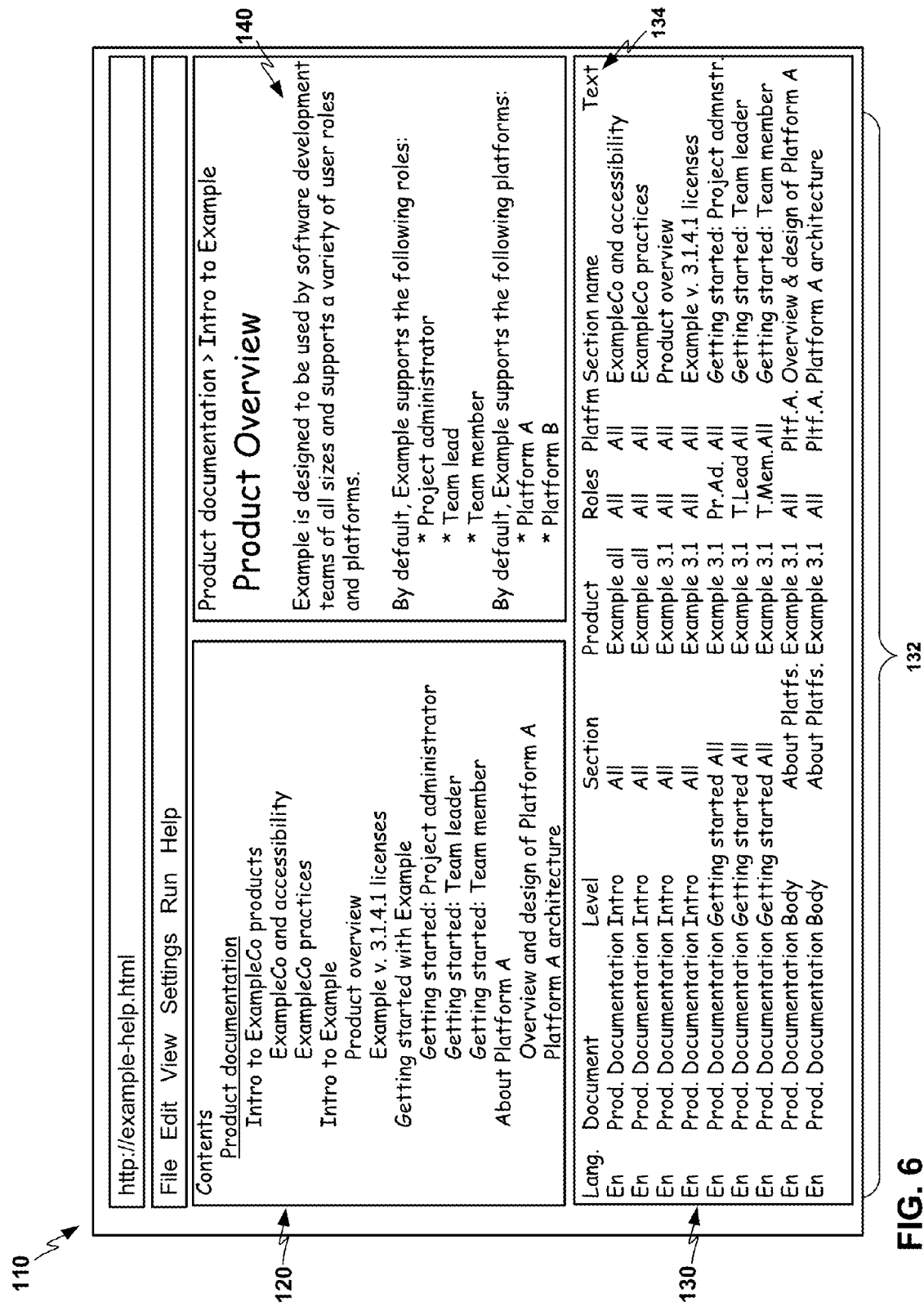
FIG. 6 depicts a screenshot of another example multidimensional text querying user interface with a portion of a resulting custom text document as it may be displayed on a computing device display screen.

FIG. 6 depicts a screenshot of another example multidimensional text querying user interface 110, including a representative portion of a document outline 120 and representative portion of a fact table 130, with a portion of a resulting custom text document, in this case a product help document 140, as it may be displayed on a computing device display screen. Product help document 140 may be stored, managed, updated, and generated from the multidimensional text database being illustratively accessed through multidimensional text querying user interface 110 and fact table 130.

Fact table 130 may be used to store a body of segments of text that generalize the documentation for the example product, including product help documentation that may be used periodically or ad hoc to generate custom text documents such as custom product help document 140. Fact table 130 may form a data source for searching or organizing selected text. Fact table 130 includes several dimension columns 132 that may be used to organize and index its contents, and a measure column 134 that includes passages of text that are categorized by the dimension columns 132 and that may form a source of text in a data source. While the view depicted in FIG. 6 is simplified and truncated, each of the entries in measure column 134 may include a body of text of any length, from a single word, phrase, or sentence, to a page, a section, a chapter, a book, or any other length or format of text.

The dimension columns 132 may be a portion of the total dimension columns available in the data source associated with fact table 130. The dimension columns 132 may include a LanguageId fkey (i.e. depicted in dimension columns 132 in FIG. 6 under the title "Lang."), a SectionId fkey (i.e. "Section"), a LevelId fkey (i.e. "Level"), a ProductId fkey (i.e. "Product"), a TasksId fkey (i.e. "Tasks"), a RolesId fkey (i.e. "Roles"), a PlatformId fkey (i.e. "Platfm"), and a SectionName varchar (i.e. "Section name"), associated with a text varchar, i.e. "Text" files in measure column 134.

Similarly, the data source associated with fact table 130 may also include a dimensions vector (not depicted in FIG. 6), that may also be accessible in multidimensional text querying user interface 110, and may define dimensions for each of the dimension columns 132. For example, the dimensions vector may include a dimension column for the LanguageId fkey that may list a number of language options including English, French, Spanish, German, Japanese, Mandarin Chinese, Hindi, Urdu, Hmong, etc. Making selections from the language dimension column in multidimensional text querying user interface 110 may allow selection of portions of text documentation in the data source from any of the languages indicated by the language dimensions. The Language selections may be displayed in fact table 130 for further interaction in defining a multidimensional query term for fact table 130 as a source of text.

The dimensions table may also include a Document dimension column in which the user has specified the Product Documentation member; a SectionId fkey dimension column that lists a number of Section dimensions, such as "All", "About Platforms" (as seen in fact table 130), "Installing and upgrading", etc.; a LevelId fkey dimension column that lists a number of Level dimensions, such as "All", "Intro", "Regular", etc.; and similar dimension columns each listing various applicable dimensions, including dimension columns for Tasks, Roles, Platforms, and Section names. Various example dimensions for each of these are illustratively represented in the simplified and truncated illustrative view of fact table 130 in FIG. 6, with the understanding that a great deal more dimensions may be available for each of the dimension columns in various examples.

By making selections in the dimensions table and the fact table 130, a user may be enabled to generate custom text documents with the desired portions of information. For example, instead of wading through the entire help documentation for the example product, when many of the products, tasks, roles, platforms, and sections may not be of any interest or relevance to the user or the user's audience, the user may make relevant selections in the dimension vector and fact table 130 to custom craft a new text document with just the desired information.

As an illustrative example, an example user may be a team leader working on a project, the team is using the example product to do their work on the project, and the team leader is bringing three new people onto the team, and wants to give them the information they need to become familiar enough with the example product to get started. The team has just upgraded to a brand new version of the example product, version 3.1.4.1, and is using a version of the product for operating on Platform D. Additionally, while the three new team members all speak fluent English as a second language, their native languages are French, Farsi, and Tulu, respectively. The team leader may use multidimensional text querying user interface 110 to go into the dimension vector and define a multidimensional query term to generate a custom text document derived from the total source of text indexed by the dimension vector and fact table for this source of text.

Working in multidimensional text querying user interface 110, the user selects only the "Product overview" member in the Document dimension column, the "All" and "Intro" members in the Level dimension column, the "Example all" and "Example 3.1.4.1" members in the Product dimension column, the "All" and "Team member" members in the Roles dimension column, the "All" and "Platform D" members in the Platforms dimension column, and so forth. Additionally, the team leader selects to generate three different custom text documents, each with the above selections, and each with the "English" dimension selected in the Language dimension column, but one custom text document that also includes the "French" dimension selected in the Language dimension column, one custom text document that also includes the "Farsi" dimension selected in the Language dimension column, and one custom text document that also includes the "Tulu" dimension selected in the Language dimension column.

The team leader may make selections in a dimension vector interface window adjacent to the position of fact table 130 or in the same position temporarily in place of fact table 130. While the team leader works in the dimension vector and the fact table 130 to build the definition of the multidimensional query term, she may watch or generate preview forms of the resulting custom text document, both in outline form in document outline 120 and in the view of product help document 140 as depicted in FIG. 6. These may be generated by iterative full query execution, or may be a partial or predicted view without executing iterative queries. Once the team leader is satisfied with the multidimensional query term, she hits "run" to execute a query on the selected source of text, i.e. the product documentation for the example product, based on the multidimensional query term the team leader has defined in multidimensional text querying user interface 110.

The multidimensional text querying application 25B then retrieves a query result set comprising elements of text responsive to the multidimensional query term from the product documentation for the example product. Selecting the elements of text responsive to the multidimensional query term includes selecting sections of text only from the example product documentation in the four selected languages, and just the sections indexed to apply to version 3.1.4.1, applicable to all platforms or specifically Platform D, and indexed as applicable to either all roles or a team member role, etc.

The multidimensional text querying application 25B then transforms the query result set to automatically generate three custom text documents, by applying suitable formatting to each, such as formatting the elements of text from raw ASCII text files into an integrated HTML file, for example. The multidimensional text querying application 25B may also transform the query result set by formatting each custom text document with each page rendered side-by-side in both English and the selected second language, for three different custom bilingual documents, so each recipient is able to read it in a language of their choice or refer to the version in their native language if they prefer, or compare unfamiliar technical terminology between English and their native language. The multidimensional text querying application 25B then provides the three different custom text document via an output device, which may include emailing each document to its designated recipient, or posting each document to a dashboard for the designated recipient, or simply pushing the documents to a separate application or server responsible for distributing it to the target recipients, or sending the documents to a printer for printing hard copies, for example.

A few weeks later, the team leader may want to generate a new set of documents for all the members of the team, focusing on a feature of the example product the team will soon begin using in more depth. The version of the example product has in the meantime been patched to version 3.1.4.1.5, and a Contributor user has ensured that the patch documentation on changes to certain features has been pasted into applicable sections of the text files in the fact table. Various Contributor users may have entered other updates, comments, or other changes to the underlying source of text for the example product documentation. All these updates are automatically already in the underlying source of text, and are automatically incorporated in new custom text documents generated by the team leader. The team leader may have a number of multidimensional query terms saved that she can open, potentially modify, and then execute again, and any updates to the underlying text are automatically incorporated in the new custom text documents. The team leader may also act in a Contributor role and access the drill-down feature to go through multidimensional text querying user interface 110 to access the underlying product documentation text source, to add her own updates, comments, or other changes.

Any other user may also use multidimensional text querying user interface 110 to access the dimension vector and fact table and define their own multidimensional query terms to generate custom text documents based on the underlying source of text. The database rows in the text column, i.e. measure column 134, contain the elements of text. The ordered concatenation of text in the text column is the unformatted document. The sorting of rows may be performed by the database by sorting on the dimensional columns (e.g. Language, Section, Level, etc.) in an order defined by the user, i.e. the author of the custom text document. The default order of database members (e.g. En, Fr, Es, etc. in the Language dimensional column) may be up to the author. Changing the order of columns or members may be done to change the order of text in the custom text document. For example, if "Language" were the first dimensional column, and its dimensions begin in order with English, French, and Spanish, then the document would appear to be the English document, followed by the French document, then the Spanish document, and so on. If a user moves "Language" to be the second dimensional column, then "Section" would be the topmost level in the hierarchy, and each of the sections would appear in English, then French, then Spanish, etc.

Multidimensional text querying user interface 110 may be a viewer that serves as a client component in a client-server architecture, interacting with multidimensional text querying application 25B running on the server side. Multidimensional text querying application 25B may offer various dimensions such as a presentation dimension for formatting and otherwise transforming the elements of text in the query result set to generate custom text documents. Type and presentation layer may be second-level dimensions, i.e. properties of the database, underlying data source, or presentation layer, rather than the fact table, for example.

Figure 7:
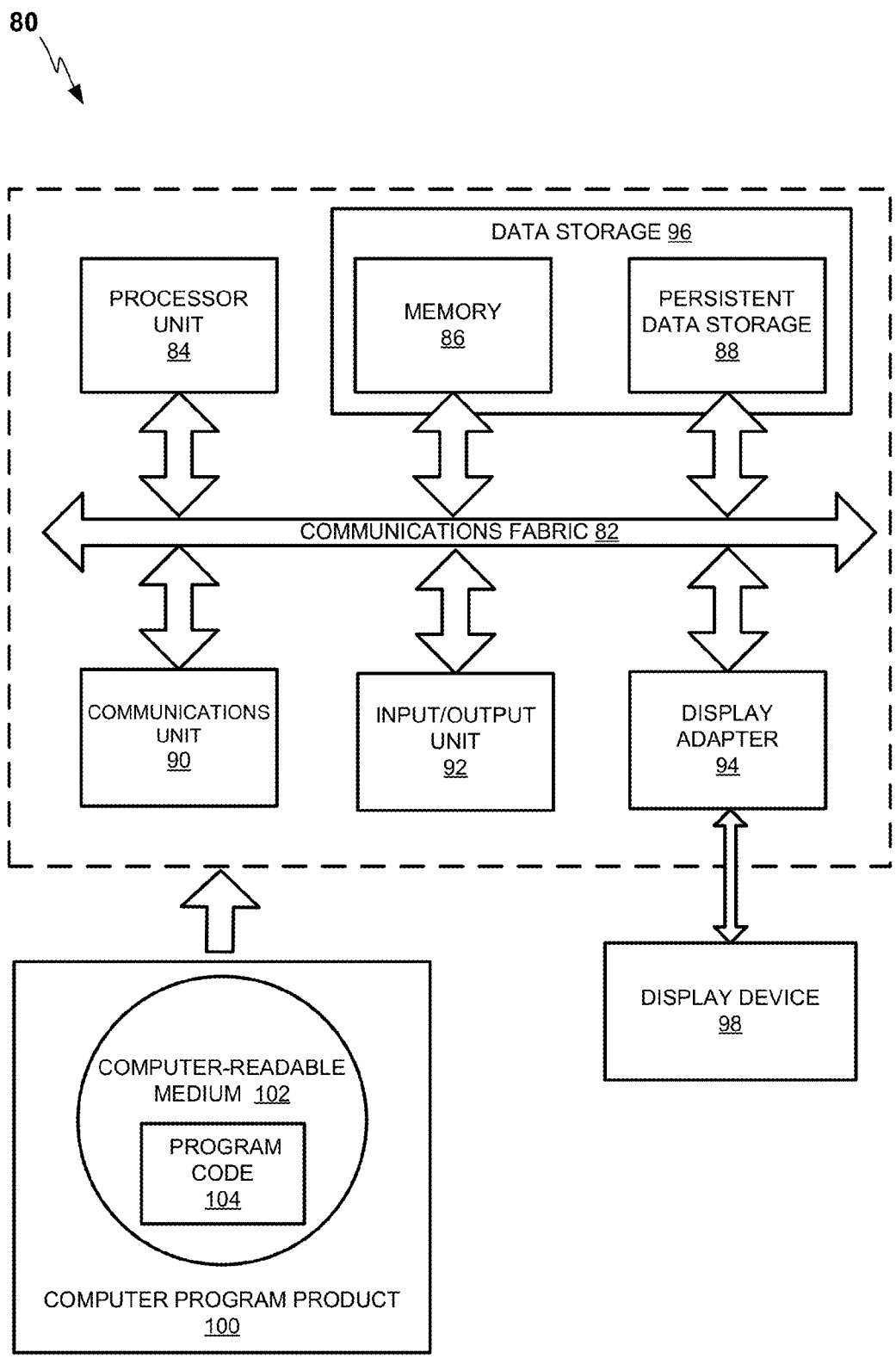
FIG. 7 is a block diagram of an example computing device that may run an application for performing multidimensional text queries to generate custom documents.

FIG. 7 is a block diagram of a computing device 80 that may be used to run a multidimensional text querying application and may issue multidimensional text queries on selected sources of text in data sources according to user-selected dimensions and/or filters, and transform the query result sets to generate custom text documents, according to an illustrative example. The multidimensional text querying application may be enabled to issue multidimensional text queries and generate custom text documents either by incorporating this capability within a single application, or by making calls and requests to and otherwise interacting with any of a number of other modules, libraries, data access services, indexes, databases, servers, or other computing environment resources, for example. Computing device 80 may be a workstation, server, mainframe computer, notebook or laptop computer, desktop computer, tablet, smartphone, feature phone, or other programmable data processing apparatus of any kind. Computing device 80 of FIG. 7 may represent any of application servers 14B, web servers 14A, or computing devices 16A-16N as depicted in FIGS. 1 and 2, for example. Other possibilities for computing device 80 are possible, including a computer having capabilities or formats other than or beyond those described herein.

In this illustrative example, computing device 80 includes communications fabric 82, which provides communications between processor unit 84, memory 86, persistent data storage 88, communications unit 90, and input/output (I/O) unit 92. Communications fabric 82 may include a dedicated system bus, a general system bus, multiple buses arranged in hierarchical form, any other type of bus, bus network, switch fabric, or other interconnection technology. Communications fabric 82 supports transfer of data, commands, and other information between various subsystems of computing device 80.

Processor unit 84 may be a programmable central processing unit (CPU) configured for executing programmed instructions stored in memory 86. In another illustrative example, processor unit 84 may be implemented using one or more heterogeneous processor systems in which a main processor is present with secondary processors on a single chip. In yet another illustrative example, processor unit 84 may be a symmetric multi-processor system containing multiple processors of the same type. Processor unit 84 may be a reduced instruction set computing (RISC) microprocessor such as a PowerPC® processor from IBM® Corporation, an x86 compatible processor such as a Pentium® processor from Intel® Corporation, an Athlon® processor from Advanced Micro Devices® Corporation, or any other suitable processor. In various examples, processor unit 84 may include a multi-core processor, such as a dual core or quad core processor, for example. Processor unit 84 may include multiple processing chips on one die, and/or multiple dies on one package or substrate, for example. Processor unit 84 may also include one or more levels of integrated cache memory, for example. In various examples, processor unit 84 may comprise one or more CPUs distributed across one or more locations.

Data storage 96 includes memory 86 and persistent data storage 88, which are in communication with processor unit 84 through communications fabric 82. Memory 86 can include a random access semiconductor memory (RAM) for storing application data, i.e., computer program data, for processing. While memory 86 is depicted conceptually as a single monolithic entity in FIG. 7, in various examples, memory 86 may be arranged in a hierarchy of caches and in other memory devices, in a single physical location, or distributed across a plurality of physical systems in various forms. While memory 86 is depicted physically separated from processor unit 84 and other elements of computing device 80, memory 86 may refer equivalently to any intermediate or cache memory at any location throughout computing device 80, including cache memory proximate to or integrated with processor unit 84 or individual cores of processor unit 84.

Persistent data storage 88 may include one or more hard disc drives, solid state drives, flash drives, rewritable optical disc drives, magnetic tape drives, or any combination of these or other data storage media. Persistent data storage 88 may store computer-executable instructions or computer-readable program code for an operating system, application files comprising program code, data structures or data files, and any other type of data. These computer-executable instructions may be loaded from persistent data storage 88 into memory 86 to be read and executed by processor unit 84 or other processors. Data storage 96 may also include any other hardware elements capable of storing information, such as, for example and without limitation, data, program code in functional form, and/or other suitable information, either on a temporary basis and/or a permanent basis.

Persistent data storage 88 and memory 86 are examples of physical, tangible, non-transitory computer-readable data storage devices. Data storage 96 may include any of various forms of volatile memory that may require being periodically electrically refreshed to maintain data in memory, but those skilled in the art will recognize that this also constitutes an example of a physical, tangible, non-transitory computer-readable data storage device. Executable instructions are stored on a non-transitory medium when program code is loaded, stored, relayed, buffered, or cached on a non-transitory physical medium or device, including if only for only a short duration or only in a volatile memory format.

Processor unit 84 can also be suitably programmed to read, load, and execute computer-executable instructions or computer-readable program code for a multidimensional text querying application that issues multidimensional text queries, and transforms the query result sets to generate custom text documents, as described in greater detail above. This program code may be stored on memory 86, persistent data storage 88, or elsewhere in computing device 80. This program code may also take the form of program code 104 stored on computer-readable medium 102 comprised in computer program product 100, and may be transferred or communicated, through any of a variety of local or remote means, from computer program product 100 to computing device 80 to be enabled to be executed by processor unit 84, as further explained below.

The operating system may provide functions such as device interface management, memory management, and multiple task management. The operating system can be a Unix based operating system such as the AIX® operating system from IBM® Corporation, a non-Unix based operating system such as the Windows® family of operating systems from Microsoft® Corporation, a network operating system such as JavaOS® from Oracle® Corporation, a mobile device operating system such as iOS® from Apple® Inc., or any other suitable operating system. Processor unit 84 can be suitably programmed to read, load, and execute instructions of the operating system.

Communications unit 90, in this example, provides for communications with other computing or communications systems or devices. Communications unit 90 may provide communications through the use of physical and/or wireless communications links. Communications unit 90 may include a network interface card for interfacing with a LAN 16, an Ethernet adapter, a Token Ring adapter, a modem for connecting to a transmission system such as a telephone line, or any other type of communication interface. Communications unit 90 can be used for operationally connecting many types of peripheral computing devices to computing device 80, such as printers, bus adapters, and other computers. Communications unit 90 may be implemented as an expansion card or be built into a motherboard, for example.

The input/output unit 92 can support devices suited for input and output of data with other devices that may be connected to computing device 80, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 92 may also include any type of interface for video output in any type of video output protocol and any type of monitor or other video display technology, in various examples. It will be understood that some of these examples may overlap with each other, or with example components of communications unit 90 or data storage 96. Input/output unit 92 may also include appropriate device drivers for any type of external device, or such device drivers may reside in the operating system or elsewhere on computing device 80 as appropriate.

Computing device 80 also includes a display adapter 94 in this illustrative example, which provides one or more connections for one or more display devices, such as display device 98, which may include any of a variety of types of display devices, including a display screen for displaying the screenshot of multidimensional text querying user interface 60 as shown in FIG. 5. It will be understood that some of these examples may overlap with example components of communications unit 90 or input/output unit 92. Input/output unit 92 may also include appropriate device drivers for any type of external device, or such device drivers may reside in the operating system or elsewhere on computing device 80 as appropriate. Display adapter 94 may include one or more video cards, one or more graphics processing units (GPUs), one or more video-capable connection ports, or any other type of data connector capable of communicating video data, in various examples. Display device 98 may be any kind of video display device, such as a monitor, a television, or a projector, in various examples.

Input/output unit 92 may include a drive, socket, or outlet for receiving computer program product 100, which comprises a computer-readable medium 102 having computer program code 104 stored thereon. For example, computer program product 100 may be a CD-ROM, a DVD-ROM, a Blu-Ray disc, a magnetic disc, a USB stick, a flash drive, or an external hard disc drive, as illustrative examples, or any other suitable data storage technology. Computer program code 104 may include a multidimensional text querying application that issues multidimensional text queries, and transforms the query result sets to generate custom text documents, as described above.

Computer-readable medium 102 may include any type of optical, magnetic, or other physical medium that physically encodes program code 104 as a binary series of different physical states in each unit of memory that, when read by computing device 80, induces a physical signal that is read by processor 84 that corresponds to the physical states of the basic data storage elements of storage medium 102, and that induces corresponding changes in the physical state of processor unit 84. That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of processor unit 84, thereby physically causing processor unit 84 to generate physical outputs that correspond to the computer-executable instructions, in a way that modifies computing device 80 into a new physical state and causes computing device 80 to physically assume new capabilities that it did not have until its physical state was changed by loading the executable instructions comprised in program code 104.

In some illustrative examples, program code 104 may be downloaded over a network to data storage 96 from another device or computer system, such as a server, for use within computing device 80. Program code 104 comprising computer-executable instructions may be communicated or transferred to computing device 80 from computer-readable medium 102 through a hard-line or wireless communications link to communications unit 90 and/or through a connection to input/output unit 92. Computer-readable medium 102 comprising program code 104 may be located at a separate or remote location from computing device 80, and may be located anywhere, including at any remote geographical location anywhere in the world, and may relay program code 104 to computing device 80 over any type of one or more communication links, such as the Internet and/or other packet data networks. The program code 104 may be transmitted over a wireless Internet connection, or over a shorter-range direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 104 may be transmitted from a source computer-readable medium 102 over non-tangible media, such as communications links or wireless transmissions containing the program code 104. Program code 104 may be more or less temporarily or durably stored on any number of intermediate tangible, physical computer-readable devices and media, such as any number of physical buffers, caches, main memory, or data storage components of servers, gateways, network nodes, mobility management entities, or other network assets, en route from its original source medium to computing device 80.

As will be appreciated by one skilled in the art, aspects of the present invention may be embodied as a method, a computing system, or a computer program product, for example. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, aspects of the present invention may take the form of a computer program product embodied in one or more computer-readable data storage devices or computer-readable data storage components that include computer-readable medium(s) having computer readable program code embodied thereon. For example, a computer-readable data storage device may be embodied as a tangible device that may include a tangible, non-transitory data storage medium, as well as a controller configured for receiving instructions from a resource such as a central processing unit (CPU) to retrieve information stored at one or more particular addresses in the tangible, non-transitory data storage medium, and for retrieving and providing the information stored at those particular one or more addresses in the data storage medium.

The data storage device may store information that encodes both instructions and data, for example, and may retrieve and communicate information encoding instructions and/or data to other resources such as a CPU, for example. The data storage device may take the form of a main memory component such as a hard disc drive or a flash drive in various embodiments, for example. The data storage device may also take the form of another memory component such as a RAM integrated circuit or a buffer or a local cache in any of a variety of forms, in various embodiments. This may include a cache integrated with a controller, a cache integrated with a graphics processing unit (GPU), a cache integrated with a system bus, a cache integrated with a multi-chip die, a cache integrated within a CPU, or the processor registers within a CPU, as various illustrative examples. The data storage apparatus or data storage system may also take a distributed form such as a redundant array of independent discs (RAID) system or a cloud-based data storage service, and still be considered to be a data storage component or data storage system as a part of or a component of an embodiment of a system of the present disclosure, in various embodiments.

Any combination of one or more computer readable medium(s) may be utilized. The computer readable medium may be a computer readable signal medium or a computer readable storage medium. A computer readable storage medium may be, for example, but is not limited to, an electronic, magnetic, optical, electromagnetic, infrared, electro-optic, heat-assisted magnetic, or semiconductor system, apparatus, or device, or any suitable combination of the foregoing. A non-exhaustive list of additional specific examples of a computer readable storage medium includes the following: an electrical connection having one or more wires, a portable computer diskette, a hard disc, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device, for example.

Program code embodied on a computer readable medium may be transmitted using any appropriate medium, including but not limited to radio frequency (RF) or other wireless, wireline, optical fiber cable, etc., or any suitable combination of the foregoing. Computer program code for carrying out operations for aspects of the present invention may be written in any combination of one or more programming languages, including an object oriented programming language such as Java, Smalltalk, C++, Objective-C, or the like, or other imperative programming languages such as C, or functional languages such as Common Lisp, Haskell, or Clojure, or multi-paradigm languages such as C#, Python, Ruby, or Scala, among a variety of illustrative examples. One or more sets of applicable program code may execute partly or entirely on the user's desktop or laptop computer, smartphone, tablet, or other computing device; as a stand-alone software package, partly on the user's computing device and partly on a remote computing device; or entirely on one or more remote servers or other computing devices, among various examples. In the latter scenario, the remote computing device may be connected to the user's computing device through any type of network, including a local area network (LAN) or a wide area network (WAN), or the connection may be made to an external computer (for example, through a public network such as the Internet using an Internet Service Provider), and for which a virtual private network (VPN) may also optionally be used.

In various illustrative embodiments, various computer programs, software applications, modules, or other software elements may be executed in connection with one or more user interfaces being executed on a client computing device, that may also interact with one or more web server applications that may be running on one or more servers or other separate computing devices and may be executing or accessing other computer programs, software applications, modules, databases, data stores, or other software elements or data structures.

A graphical user interface may be executed on a client computing device and may access applications from the one or more web server applications, for example. Various content within a browser or dedicated application graphical user interface may be rendered or executed in or in association with the web browser using any combination of any release version of HTML, CSS, JavaScript, XML, AJAX, JSON, and various other languages or technologies. Other content may be provided by computer programs, software applications, modules, or other elements executed on the one or more web servers and written in any programming language and/or using or accessing any computer programs, software elements, data structures, or technologies, in various illustrative embodiments.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, may create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices, to produce a computer implemented process such that the instructions which execute on the computer or other programmable apparatus provide or embody processes for implementing the functions or acts specified in the flowchart and/or block diagram block or blocks.

The flowchart and block diagrams in the figures illustrate the architecture, functionality, and operation of possible implementations of devices, methods and computer program products according to various embodiments of the present disclosure. In this regard, each block in the flowchart or block diagrams may represent a module, segment, or portion of code, which includes one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may be executed in a different order, or the functions in different blocks may be processed in different but parallel threads, depending upon the functionality involved. Each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The description of the present disclosure has been presented for purposes of illustration and description, and is not intended to be exhaustive or limited to the disclosure in the form disclosed. Many modifications and variations will be understood by those of ordinary skill in the art based on the concepts disclosed herein. The particular examples described were chosen and disclosed in order to explain the principles of the disclosure and example practical applications, and to enable others of ordinary skill in the art to understand the disclosure for various embodiments with various modifications as are suited to the particular use contemplated. The various examples described herein and other embodiments are within the scope of the following claims.

What is claimed is:

1. A method comprising:
providing a user interface for defining multidimensional query terms for one or more selected sources of text in an intermediate multidimensional data store that stores extracted and transformed sources of text in a conformed format from a plurality of data sources, wherein the user interface is operated in accordance with a plurality of user roles comprising an author role, a contributor role, and a developer role, wherein operating the user interface in accordance with the contributor role enables options in the user interface to edit text in the sources of text and to edit a schema comprising a measure element and a dimension element for defining the multidimensional query term, and wherein operating the user interface in accordance with the developer role enables options in the user interface to configure an Extraction, Transformation and Loading (ETL) tool to populate the intermediate multidimensional data store with the sources of text from the plurality of data sources;
receiving a multidimensional query term on one or more selected sources of text in an intermediate multidimensional data store that stores extracted and transformed sources of text in a conformed format from a plurality of data sources;
executing a query on the one or more selected sources of text in the intermediate multidimensional data store based on the multidimensional query term;
retrieving a query result set comprising elements of text responsive to the multidimensional query term from the one or more selected sources of text in the multidimensional data store;
generating a custom text document based at least in part on the query result set; and
providing the custom text document via an output device.

2. The method of claim 1, further comprising providing a user interface for defining the multidimensional query term for the one or more selected sources of text, wherein providing the user interface comprises:
- providing a user interface element for a schema comprising a dimension vector with dimensions applicable to the one or more selected sources of text; and
- providing user options for selecting from among the dimensions for defining the multidimensional query term.

3. The method of claim 2, further comprising:
providing user-selectable options for assigning the dimensions to formatting options for the custom text document.

4. The method of claim 2, further comprising:
providing user-selectable options for filtering the members of selected dimensions for defining the multidimensional query term.

5. The method of claim 4, further comprising:
providing user-selectable options for adding a dimension to the multidimensional query term and filtering the members of the added dimension for defining the multidimensional query term.

6. The method of claim 2, further comprising:
providing user-selectable options for adding a dimension to the multidimensional query term.

7. The method of claim 2, wherein the user interface comprises a drag-and-drop interface that provides user-selectable graphical elements representing the dimensions and enables a user to add a dimension to the multidimensional query term by selecting a graphical element representing the dimension and dragging the graphical element representing the dimension to a graphical section representing the multidimensional query term.

8. The method of claim 2, wherein the user interface comprises a drag-and-drop interface that provides graphical elements representing members of selected dimensions, wherein the drag-and-drop interface further enables a user to filter the values of the selected dimensions for defining the multidimensional query term by selecting a graphical element representing a member and dragging the graphical element representing the member to the graphical section representing the multidimensional query term.

9. The method of claim 2, wherein the user interface comprises a drag-and-drop interface that provides user-selectable graphical elements representing the members and enables a user to add a dimension to the multidimensional query term and filter the members of the selected dimension by selecting a graphical element representing the member and dragging the graphical element representing the member to the graphical section representing the multidimensional query term.

10. The method of claim 1, further comprising:
- tracking an association between the custom text document and the one or more selected sources of text in the intermediate multidimensional data store; and
- enabling the custom text document with a user-selectable option to select a portion of the custom text document and access a corresponding portion of the one or more selected sources of text in the intermediate multidimensional data store.

11. The method of claim 1, further comprising:
- tracking an association between the custom text document and the one or more selected sources of text in the intermediate multidimensional data store;
- enabling the custom text document with a user-selectable option to add a new portion of text to the custom text document;
- receiving a new portion of text added to the custom text document; and
- storing the new portion of text in association with the one or more selected sources of text in the intermediate multidimensional data store.

12. The method of claim 1, wherein generating the custom text document based at least in part on the query result set comprises at least one of transforming, concatenating, and formatting the retrieved query result set.

13. The method of claim 1, further comprising:
- providing a user interface for tagging sections of a given source of text with dimensional tags; and
- storing the dimensional tags in association with the given source of text in the intermediate multidimensional data store, to be available for subsequent queries.

14. The method of claim 1, further comprising:
- receiving a first source of text; and
- generating a multidimensional index for the first source of text;
- wherein the first source of text is selected as the one or more selected sources of text for the multidimensional query term;
- wherein executing the query on the one or more selected sources of text in the intermediate multidimensional data store based on the multidimensional query term comprises comparing the multidimensional query term with the multidimensional index.

15. The method of claim 1, the method further comprising:
- saving the multidimensional query term for the one or more selected sources of text;
- subsequent to the providing the custom text document, receiving an input for generating an updated custom text document;
- executing a new query on the one or more selected sources of text in the intermediate multidimensional data store based on the saved multidimensional query term;
- retrieving an updated query result set comprising elements of text responsive to the saved multidimensional query term from the one or more selected sources of text in the intermediate multidimensional data store;
- transforming the updated query result set to generate an updated custom text document; and
- providing the updated custom text document via the output device.

16. The method of claim 1, wherein generating the custom text document based at least in part on the query result set comprises applying formatting parameters comprised in the multidimensional query term to the query result set.

17. The method of claim 1, wherein operating the user interface in accordance with the author role enables options in the user interface to compose the multidimensional query term, to save the multidimensional query term, to enter an input to generate an updated version of the custom text document based on the saved multidimensional query term, to edit the saved multidimensional query term, and to control settings of a presentation layer for how a query result set from the multidimensional query term is transformed to generate the custom text document.

18. A computing system comprising:
- one or more processors;
- one or more computer-readable non-transitory storage devices;
- a display device;
- a user input device;
- program instructions, stored on at least one of the one or more computer-readable tangible storage devices for execution by at least one of the one or more processors, to provide, via a user input device, a user interface for defining multidimensional query terms for one or more selected sources of text in an intermediate multidimensional data store that stores extracted and transformed sources of text in a conformed format from a plurality of data sources;

program instructions, stored on at least one of the one or more computer-readable tangible storage devices for execution by at least one of the one or more processors, to receive, via the user interface, a multidimensional query term on the one or more selected sources of text in the intermediate multidimensional data store;

program instructions, stored on at least one of the one or more computer-readable tangible storage devices for execution by at least one of the one or more processors, to execute a query on the one or more selected sources of text in the intermediate multidimensional data store based on the multidimensional query term;

program instructions, stored on at least one of the one or more computer-readable tangible storage devices for execution by at least one of the one or more processors, to retrieve a query result set comprising elements of text responsive to the multidimensional query term from the one or more selected sources of text in the intermediate multidimensional data store;

program instructions, stored on at least one of the one or more computer-readable tangible storage devices for execution by at least one of the one or more processors, to generate a custom text document based at least in part on the query result set; and program instructions, stored on at least one of the one or more computer-readable tangible storage devices for execution by at least one of the one or more processors, to provide the custom text document via an output device, wherein the program instructions to provide the user interface for defining multidimensional query terms for the intermediate multidimensional data store comprise:

program instructions for operating the user interface in accordance with a plurality of user roles comprising an author role, a contributor role, and a developer role, wherein the program instructions for operating the user interface in accordance with the author role enable options in the user interface to compose the multidimensional query term, to save the multidimensional query term, to enter an input to generate an updated version of the custom text document based on the saved multidimensional query term, to edit the saved multidimensional query term, and to control settings of a presentation layer for how a query result set from the multidimensional query term is transformed to generate the custom text document, wherein the program instructions for operating the user interface in accordance with the contributor role enable options in the user interface to edit text in the sources of text and to edit a schema comprising a measure element and a dimension element for defining the multidimensional query term, and wherein the program instructions for operating the user interface in accordance with the developer role enable options in the user interface to configure an Extraction, Transformation and Loading (ETL) tool to populate the intermediate multidimensional data store with the sources of text from the plurality of data sources.

19. The computing system of claim 18, wherein the program instructions for operating the user interface in accordance with the author role enable user interface elements in the user interface that comprise a schema with a measure user interface element and a dimension user interface element for defining measures and dimensions, a row area for defining rows, a column area for defining columns, a filter area for defining a filter, and at least a portion of the custom text document.

20. The computing system of claim 18, wherein the program instructions for operating the user interface in accordance with the author role enable user interface elements in the user interface that comprise at least a portion of a document outline, at least a portion of a fact table, and at least a portion of the custom text document.

21. A computer program product comprising:

one or more computer-readable non-transitory storage devices;

program instructions, stored on at least one of the one or more computer-readable tangible storage devices, to provide, via a user input device, a user interface for defining multidimensional query terms for sources of text;

program instructions, stored on at least one of the one or more computer-readable tangible storage devices, to receive, via the user interface, a multidimensional query term on one or more selected sources of text in one or more data sources;

program instructions, stored on at least one of the one or more computer-readable tangible storage devices, to execute a query on the one or more selected sources of text in the one or more data sources based on the multidimensional query term;

program instructions, stored on at least one of the one or more computer-readable tangible storage devices, to retrieve a query result set comprising elements of text responsive to the multidimensional query term from the one or more selected sources of text in the one or more data sources;

program instructions, stored on at least one of the one or more computer-readable tangible storage devices, to generate a custom text document based at least in part on the query result set; and program instructions, stored on at least one of the one or more computer-readable tangible storage devices, to provide the custom text document via an output device;

program instructions, stored on at least one of the one or more computer-readable tangible storage devices, to receive an input for generating an updated custom text document;

program instructions, stored on at least one of the one or more computer-readable tangible storage devices, to execute a new query on the one or more selected sources of text in the data source based on the multidimensional query term;

program instructions, stored on at least one of the one or more computer-readable tangible storage devices, to retrieve an updated query result set comprising elements of text responsive to the multidimensional query term from the one or more selected sources of text in the data source;

program instructions, stored on at least one of the one or more computer-readable tangible storage devices, to transform the updated query result set to generate an updated custom text document; and program instructions, stored on at least one of the one or more computer-readable tangible storage devices, to provide the updated custom text document via the output device, wherein the program instructions to provide the user interface for defining multidimensional query terms for the intermediate multidimensional data store comprise:

program instructions for operating the user interface in accordance with a plurality of user roles comprising an author role, a contributor role, and a developer role, wherein the program instructions for operating the user interface in accordance with the author role enable options in the user interface to compose the multidimensional query term, to save the multidimensional query term, to enter an input to generate an updated version of the custom text document based on the saved multidimensional query term, to edit the saved multidimensional query term, and to control settings of a presentation layer for how a query result set from the multidimensional query term is transformed to generate the custom text document, wherein the program instructions for operating the user interface in accordance with the contributor role enable options in the user interface to edit text in the sources of text and to edit a schema comprising a measure element and a dimension element for defining the multidimensional query term, and wherein the program instructions for operating the user interface in accordance with the developer role enable options in the user interface to configure an Extraction, Transformation and Loading (ETL) tool to populate the intermediate multidimensional data store with the sources of text from the plurality of data sources.

22. The computer program product of claim 21, wherein the program instructions to provide, via a user input device, a user interface for defining multidimensional query terms for sources of text comprises:

program instructions to provide a schema comprising a dimension vector with dimensions applicable to the one or more selected sources of text; and program instructions to provide user options for selecting from among the dimensions for defining the multidimensional query term.

23. The computer program product of claim 22, wherein the program instructions to provide the user interface comprise program instructions to provide a drag-and-drop interface that provides user-selectable graphical elements representing the dimensions and enables a user to add a dimension to the multidimensional query term by selecting a graphical element representing the dimension and dragging the graphical element representing the dimension to a graphical section representing the multidimensional query term, the computing system further comprising:

program instructions, stored on at least one of the one or more computer-readable tangible storage devices, to provide graphical elements representing filters for filtering the values of selected dimensions, wherein the drag-and-drop interface further enables a user to filter the values of the selected dimensions for defining the multidimensional query term by selecting a graphical element representing a filter and dragging the graphical element representing the filter to the graphical section representing the multidimensional query term.

24. The computer program product of claim 21, further comprising:

program instructions, stored on at least one of the one or more computer-readable tangible storage devices, to track an association between the custom text document and the one or more selected sources of text in the one or more data sources;

program instructions, stored on at least one of the one or more computer-readable tangible storage devices, to enable the custom text document with a user-selectable option to add a new portion of text to the custom text document;

program instructions, stored on at least one of the one or more computer-readable tangible storage devices, to receive a new portion of text added to the custom text document; and program instructions, stored on at least one of the one or more computer-readable tangible storage devices, to store the new portion of text in association with the one or more selected sources of text in the one or more data sources.

* * * * *